J. GILCHRIST & A. ANDERSON.
Hose-Nozzles.
No. 196,216. Patented Oct. 16, 1877.
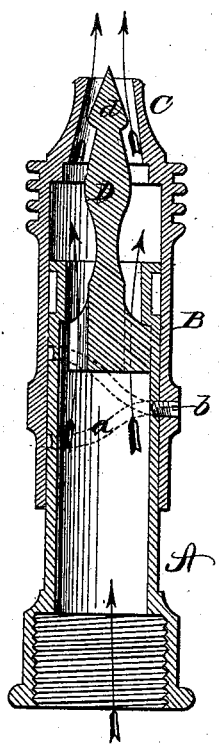
WITNESSES
Franck L. Ourand
Frank Gall
INVENTOR
Jno Gilchrist
Alexander Anderson
Alexander Mason
ATTORNEY

UNITED STATES PATENT OFFICE.

JOHN GILCHRIST, OF PAISLEY, SCOTLAND, AND ALEXANDER ANDERSON, OF LOWELL, ASSIGNORS TO WILLIAM E. WHITEHEAD AND ABEL T. ATHERTON, OF LOWELL, MASSACHUSETTS.

IMPROVEMENT IN HOSE-NOZZLES.

Specification forming part of Letters Patent No. 196,216, dated October 16, 1877; application filed August 13, 1877.

*To all whom it may concern:*

Be it known that we, JOHN GILCHRIST, of Paisley, Renfrewshire county, Scotland, and ALEXANDER ANDERSON, of Lowell, in the county of Middlesex, and in the State of Massachusetts, have invented certain new and useful Improvements in Hose-Nozzles; and do hereby declare that the following is a full, clear, and exact description thereof, reference being had to the accompanying drawings, and to the letters of reference marked thereon, making a part of this specification.

The nature of our invention consists in the construction and arrangement of a hose-nozzle, as will be hereinafter more fully set forth.

In order to enable others skilled in the art to which our invention appertains to make and use the same, we will now proceed to describe its construction and operation, referring to the annexed drawing, which represents a longitudinal section of our improved hose-nozzle.

A represents the short tube or cylinder screwed onto the coupling of the hose, and B is the exterior movable sleeve. On the outside of the tube or cylinder A is formed a spiral groove, $a$, and through one side of the sleeve B is passed a short screw, $b$, into said groove, to limit the movement of said sleeve.

The outer end of the sleeve B forms a conical mouth, C, as shown, and in the outer end of the tube A is attached a cone, D, in such a manner that the water can flow all around the same and out through the mouth or outlet C. The outer end of the cone D is formed with a swell, $d$, which constitutes the main feature of our invention.

When the sleeve B is turned up on the tube A the cone D closes the mouth C, and stops the flow of water. Now, as soon as the sleeve B is moved outward, and the water commences to flow through the mouth C, the swell $d$ at the end of the cone causes the water to pass out in the form of a spray, which is regulated by the distance of said swell from the mouth. The moment, however, that said swell or base of the outer cone enters the mouth or nozzle a straight stream is produced, varying in size according to the amount of water allowed to pass through the orifice.

Having thus fully described our invention, what we claim as new, and desire to secure by Letters Patent, is—

1. In a hose-nozzle, the combination of the tube A, with cone D, having swell or outer cone $d$, and the exterior sleeve B, with conical mouth C, substantially as and for the purposes herein set forth.

2. In combination with a hose-nozzle having a conical mouth-piece, an interior cone, constructed and arranged substantially as and for the purposes herein set forth.

In testimony that we claim the foregoing we have hereunto set our hands and seals this 7th day of July, 1877.

JOHN GILCHRIST. [L. S.]
ALEXANDER ANDERSON. [L. S.]

Witnesses:
ABEL T. ATHERTON,
JEROME B. MELVIN.